Jan. 9, 1923.   G. A. MICKELSON.   1,441,737.
SLING HOOK.
FILED JUNE 30, 1921.

INVENTOR
George A. Mickelson
By
Fahestondaugh&Co
ATTYS.

Patented Jan. 9, 1923.

1,441,737

UNITED STATES PATENT OFFICE.

GEORGE ARTHUR MICKELSON, OF VANCOUVER, BRITISH COLUMBIA, CANADA, ASSIGNOR OF ONE-HALF TO JAMES McLAGGAN MITCHELL, OF VANCOUVER, BRITISH COLUMBIA, CANADA.

SLING HOOK.

Application filed June 30, 1921. Serial No. 481,732.

*To all whom it may concern:*

Be it known that I, GEORGE ARTHUR MICKELSON, a citizen of the United States, and a resident of the city of Vancouver, in the Province of British Columbia, Canada, have invented certain new and useful Improvements in Sling Hooks, of which the following is a specification.

My invention relates to improvements in sling hooks, and the object of my invention is to provide a hook of this character which is strong and simple in construction, which lends itself to a variety of uses and quick handling, and which when in use in the unloading of sacked goods prevents the sling ropes from drawing together so that tearing of the sacks due to pinching by the sling ropes is eliminated.

I attain this object by the construction illustrated in the accompanying drawings in which—

Similar figures of reference indicate similar parts throughout the several views.

Figure 1:
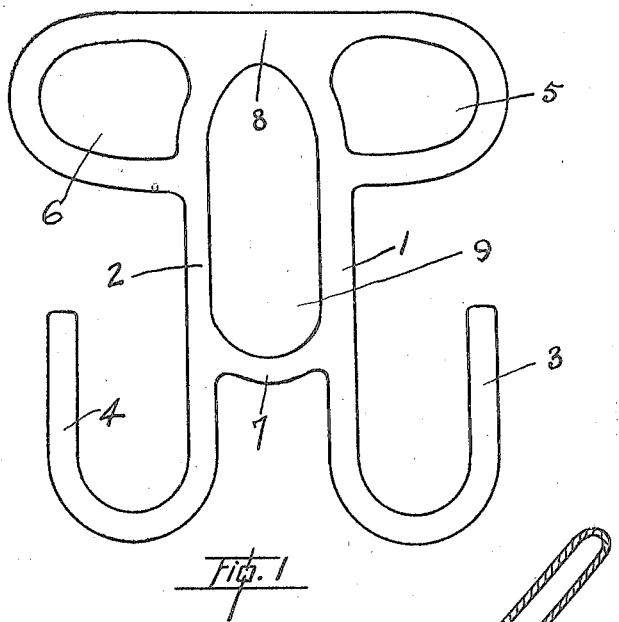
Fig. 1 is a front view of the hook.
Figure 2:
Fig. 2 is an edge view.

The device is formed preferably as shown in Fig. 1, having the shanks 1 and 2 terminating at their lower ends in the hooks 3 and 4 and at their upper ends in the eyes 5 and 6. The shanks 1 and 2 are spaced apart and are connected together intermediate their length by a bar 7 while their eyed ends 5 and 6 are connected together by an integral connecting portion 8 so that a central aperture 9 is provided in the hook proper.

Figure 3:
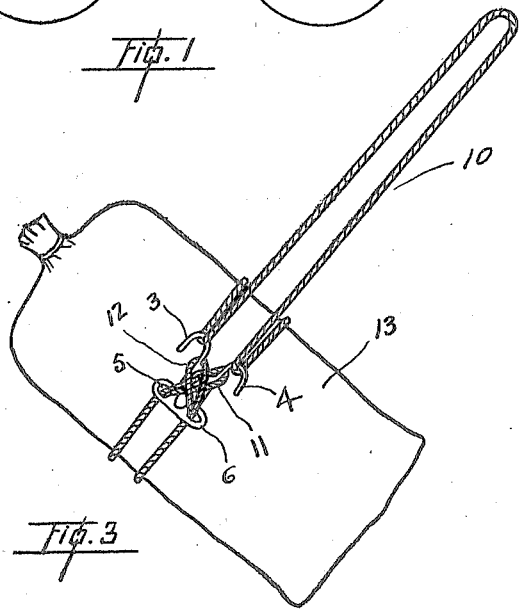
Fig. 3 is a view illustrating the practical application of the invention.

A hook formed in the manner shown and described is capable of being used to form a great many sling hitches or loops but for the purpose of illustration one use only is shown, being illustrated in Fig. 3, the sling being indicated by the numeral 10. In this case the sling consists of a rope 10 having its opposite ends eyed, as at 11 and 12, so that when using the rope as a sling for the sack 13 the rope is doubled and the eyed ends 11 and 12 respectively are passed through the eyes 6 and 5 of the hook, crossed, and looped over the hooks 3 and 4, thus attaching the hook to the rope, which is then passed around the sack and around the hooks 3 and 4 so that when the strain is on the sling the sack is tightly gripped thereby, the spaced hooks 3 and 4 and eyes 5 and 6 keeping the sling ropes apart so that they cannot draw in together and pinch the sack between, an occurrence which often happens at the present time with the present forms of hook and in many cases results in the tearing of the sack.

What I claim as my invention is:—

1. In combination, a member provided with a pair of hooks and a pair of apertures, a cable having looped ends passing through the apertures in said member and engaged with the shanks of said hooks, said cable being adapted to be passed around an object and then engaged beneath the bills of the hooks to effect a sling embracing the object.

2. A sling hook, comprising a body equipped at one end with apertured lateral projections, oppositely directed hooks at the opposite end of the body having the shank portions thereof spaced apart in an appreciable distance to define an intervening recess, the bill portions of the hook being disposed to extend in parallelism with the opposite lateral margins of the body and spaced an appreciable distance therefrom.

3. A hook comprising a pair of shanks, each terminating at one end in an eye, and at the opposite end in a hook bill, a member connecting the eyed end of the shanks together and a further member connecting the opposite ends of the shanks together.

Dated at Vancouver, B. C., this 23rd day of June, 1921.

GEORGE ARTHUR MICKELSON.